United States Patent [19]
Paulett

[11] Patent Number: 5,935,681
[45] Date of Patent: Aug. 10, 1999

[54] PERFORATED STRETCH WRAP FILM

[76] Inventor: Harry K. Paulett, 2102 Algonquin Rd., Euclid, Ohio 44117

[21] Appl. No.: 07/969,121

[22] Filed: Oct. 30, 1992

[51] Int. Cl.⁶ ...................................................... B32B 3/24
[52] U.S. Cl. ........................ 428/137; 428/131; 428/132; 428/516; 428/338; 428/220; 428/411.1; 428/523
[58] Field of Search ...................... 428/131, 132, 428/137, 516, 523, 338, 220, 411.1

[56] References Cited

U.S. PATENT DOCUMENTS

| | | | |
|---|---|---|---|
| 1,359,477 | 11/1920 | Miller | 53/528 |
| 2,842,910 | 7/1958 | Reed | 53/463 |
| 3,012,918 | 12/1961 | Scharr | 428/137 |
| 3,454,455 | 7/1969 | Rasmussen | 428/136 |
| 3,589,102 | 6/1971 | Zelnick | 53/557 |
| 3,649,431 | 3/1972 | Parker | 428/137 |
| 3,719,736 | 3/1973 | Woodruff | 428/131 |
| 3,758,355 | 9/1973 | Witherow | 428/137 |
| 3,911,186 | 10/1975 | Trotman | 428/137 |
| 4,050,221 | 9/1977 | Lancaster, III et al. | 53/211 |
| 4,077,179 | 3/1978 | Lancaster et al. | 53/441 |
| 4,152,879 | 5/1979 | Shulman | 53/399 |
| 4,261,944 | 4/1981 | Hufnagel et al. | 264/175 |
| 4,409,776 | 10/1983 | Usui | 53/399 |
| 4,418,114 | 11/1983 | Briggs et al. | 428/218 |
| 4,876,146 | 10/1989 | Isaka et al. | 428/35.2 |
| 4,927,708 | 5/1990 | Herran et al. | 428/332 |
| 4,935,271 | 6/1990 | Schirmer | 428/137 |
| 5,013,595 | 5/1991 | Parry | 428/215 |

*Primary Examiner*—William P. Watkins, III
*Attorney, Agent, or Firm*—Fay, Sharpe, Beall, Fagan, Minnich & McKee

[57] ABSTRACT

An air permeable stretch film comprises first and second layers of polymeric film which includes linear low density polyethylene and is capable of stretching at least 150% beyond their original length, said first and second layers clingingly adhered to one another to form a laminate. Each layer of polymer film comprises three sub-layers which are co-extruded. The laminate defines a plurality of self-reinforcing perforations therethrough. The perforations are formed by applying a hot pin to the laminate whereby the polymeric film is melted. As the melt hardens, the perforations become defined by welds or reinforcements which add strength to the film. The resulting film is capable of stretching to approximately 120% beyond its original length. The breathable film is applied to packaging by using stretch wrap machinery.

8 Claims, 3 Drawing Sheets

PERFORATED STRETCH WRAP FILM

BACKGROUND OF THE INVENTION

The present invention is directed to the art of packaging materials, and more particularly to the art of plastic bundling and palletizing materials.

The present invention is especially concerned with the art of plastic stretch wrap film, and will be described with particular reference thereto.

Stretch wrap films of the prior art are used in connection with a variety of overwrap packaging applications. They are typically applied to pallet loads, boxes, sheeted materials and other items in an effort to secure them for shipping or transport. The existing stretch wrap films provide desirable results when used in connection with products that are not required to breathe.

A problem with conventional stretch wrap materials is that they tend to restrict air flow to and from the wrapped or packaged items. Existing stretch wraps often cause irreparable damage, such as warping or the formation of rot, mold or mildew, to merchandise that requires the ability to breathe. For example, existing stretch wraps are undesirable in situations where the products to which they are applied are packaged at elevated temperatures. Food items, such as dog food, are known to be packaged while they are still hot. It is necessary for the heat to dissipate, and the existing wraps do not provide for this. Similarly, many types of bottles are labeled (i.e. wine bottles) and packaged while the label is still hot. By retaining the heat, the label is often damaged.

Beverages, too, often form condensation on the surfaces of their cans and bottles. The condensation must be allowed to escape and existing stretch film wraps do not permit this.

In addition, preexisting film wraps tend to suffocate items such as fresh produce, food, products packed hot, fabric and tobacco. The existing stretch wraps do not permit gases, vapors, or heat to escape from a wrapped pallet load. Moreover, existing stretch wraps often permit molding and hence, damage to fabrics, furniture and crops.

Attempts have been made to overcome the problems described above. For example, existing wrapping machinery has been modified to include a perforator on the stretcher mechanism. Perforations made by this mechanism cause tearing in the stretch wrap and the wrapping is not secure.

Other attempts have been made as well. For example, netting has been used as an alternative to stretch wrap because of its ability to breathe. Netting is most commonly seen in connection with fruits, such as apples and oranges. Netting is, however, undesirable because it is expensive and has poor load retention. Also, there is a danger that workers or machinery may become caught in the netting, causing serious injury or damage.

It would be desirable to develop a stretch film that is breathable as well as strong. It would be further desirable to develop a method for making such a breathable, strong stretch film.

The present invention contemplates a new and improved air permeable stretch wrap which overcomes all of the above problems and others and provides a bundling or palletizing material which is strong, flexible and fluid permeable.

BRIEF DESCRIPTION OF THE INVENTION

In accordance with the present invention, there is provided a fluid permeable stretch film as well as a method for producing such stretch film.

In accordance with a more limited aspect of the invention, a fluid permeable stretch film comprises a first layer of polymeric film capable of providing at least 150% stretch or increase over its original length. A second layer of polymeric film also capable of providing to at least 150% stretch over its original length is laminated with said first layer to form a laminated product. A plurality of self-reinforcing perforations are defined by said laminated product.

The invention further calls for a method of preparing a fluid permeable stretch film. The method calls for providing a first layer of polymeric film capable of providing at least 150% stretch over and above its original length, and then laminating it with a second layer of polymeric material capable of providing at least 150% stretch above its original length to form a laminated product. The laminated product is then perforated by using a hot pin which is brought close enough to "kiss" or melt the material without necessarily breaking through, and a weld is formed between the layers of the laminated product as the melted portion hardens. The resulting product comprises a fluid permeable stretch film.

A principal advantage of the invention is the ability for the film to exhaust or transmit hot air, gases, odors and moisture away from the item which is packaged and into the ambient atmosphere.

Another advantage of the present invention is that it prevents rust from forming on products that are wrapped with it and allows for the gases, vapors and heat to escape from a pallet load.

Another advantage of the present invention is found in the prevention of mold formation on fabrics and furniture which are wrapped by the stretch wrap of the present invention.

Still another advantage of the present invention is the preservation of food and other products subject to decay, damage or destruction by trapped air or gases.

Yet other advantages of the stretch film of the present invention are found in its natural resource and environmental aspects. The resins used in producing the product are made from natural gas, so there is a plentiful supply. Moreover, the stretch film product is recyclable.

Other advantages and benefits of the invention will become apparent to those skilled in the art upon a reading and understanding of the following detailed description.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof.

DETAILED DESCRIPTION OF THE PREFERRED EMBODIMENT

Figure 1:
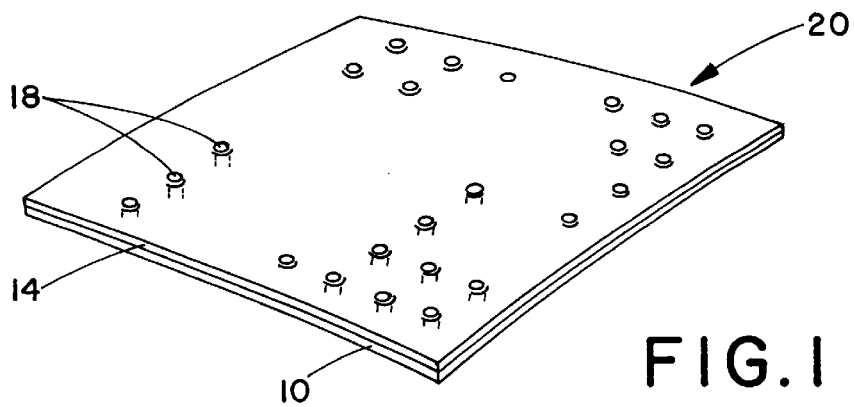
FIG. 1 illustrates a section of stretch wrap film in accordance with the present invention.

Referring now to the drawings wherein the showings are for purposes of illustrating the preferred embodiment of the invention only and not for purposes of limiting same, the figures show an air permeable stretch film in accordance with the present invention.

With attention first to FIG. 1, a first layer or ply 10 of polymeric film is laminarly bonded by natural cling forces with a second layer or ply of polymer film 14 to form a resulting laminated product. A plurality of perforations 18 are made through the film layers. The perforations are formed by a hot pin. The hot pin merely "kisses" the laminate without a need for passing through in order to form a perforation. When the hot pin approaches the laminated product formed by layers 10 and 14, the polymeric material melts.

Figures 2, 3:
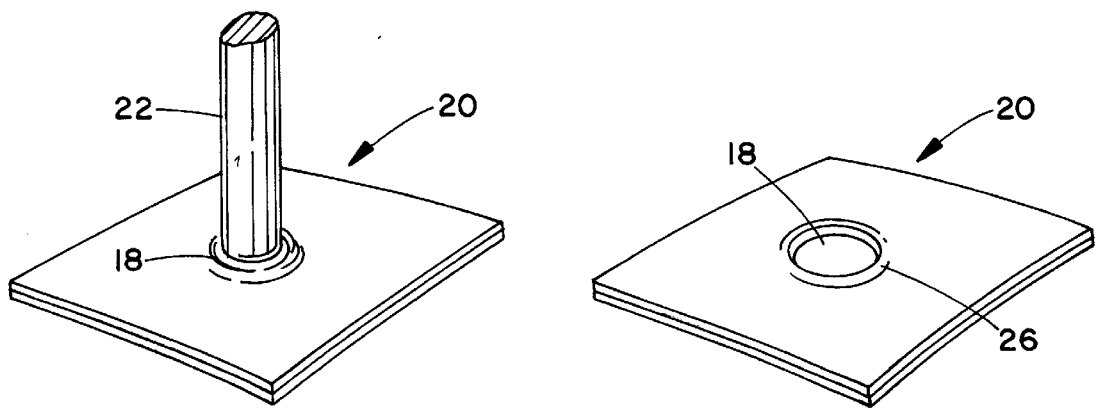
FIG. 2 represents a hot pin as it forms a perforation in the stretch wrap film.
FIG. 3 shows a diagrammatical representation of a weld formed around a perforation.

With attention directed to FIG. 2, a diagrammatical representation of a hot pin forming a perforation in a small section of laminated product 20 is shown. The hot pin 22 does not perforate the laminate. Rather, it merely approaches or lightly contacts the laminate in the manner of a kiss. The heat dissipating from pin 22 causes the laminate to melt, thereby forming a perforation substantially corresponding to the cross sectional shape of the pin. The hot pin 22 shown in FIG. 2 is circular in configuration. Therefore, the resulting perforation 18 defined by the laminate is substantially circular. It is to be appreciated that the perforation and hot pin are not limited to having a circular configuration. Squares, diamonds, triangles and other shapes, including amorphous shapes, will serve the purpose as well.

As the polymer dries, a weld forms about the perimeter of each perforation. The weld serves to assist in maintaining layers 10 and 14 in their cohesive bond or cling arrangement. The weld also strengthens the product by preventing the resulting laminar film from breaking or tearing during stretching. As shown in FIG. 3, a section of laminated sheet product 20 is shown, with an enlarged view of a single perforation 18. The resulting perforation is actually defined by weld 26, said weld having been formed during the hardening of the melted laminate.

The polymeric material used for layers 10 and 14 comprises an olefin. Preferably, the polymeric material is a linear low density polyethylene (LLDPE). Of course, other materials can be used in forming the laminated product. A distinctive feature of the present invention resides in the ability for the two polymeric film materials 10 and 14 to naturally cling or bond to one another. The welds associated with the perforations serve to strengthen the resulting stretch film.

The resulting laminate comprising layers 10 and 14 with weld holes 18 comprises a breathable stretch film. Any number of perforations may be formed, although in the preferred embodiment, the film comprises approximately 27 holes per square inch, with the size of the hole being roughly around one to one and one half mm in diameter. The holes may vary in size. The film, when wrapped around the product, allows for the transmission or exhaustion of hot air, gases, odors, water, moist air and other fluids from the wrapped item or items.

Tests were conducted on a sample of 100 gA laminate perforated with 27 holes per square inch. The air transmission rate was calculated as being about 0.625 cc/100 in$^2$/24 hrs. The oxygen transmission rate was calculated as being about 3.00 cc/100 in$^2$/24 hrs. The water vapor transmission rate was calculated as being about 22.88 gms/100 in$^2$/24 hrs.

The resulting film laminate can be stretched to as much as 200 to 300% over its original length. In a preferred embodiment, 100 gauge laminate should be able to stretch to at least about 120% over its original length. In other words, a 10 inch length of the resulting 100 gauge laminate can be stretched to at least 22 inches or as much as 30 or 40 inches.

The 160 gauge stretch wrap stretches to at least 80% beyond its original length. In other words, a 10 inch length of 160 gauge stretch wrap will stretch to at least 18 inches.

The weld-reinforced perforations present in the stretch wrap strengthen the stretch wrap and do not permit stretching to as great of an extent as when only a single ply of unlaminated film is used. This is an advantage over preexisting stretch films which comprise only a single layer of film.

When stretched to given lengths, the stretch wrap film of the present invention exhibits elastic characteristics and is able to revert downward in size after being stretched. The stretch film resists neck down during stretching to predetermined lengths.

In preparing the laminate, two individual rolls of LLDPE polymeric film (or other film) are provided. The film is unwound from each of the rolls at room temperature and the two sheets or plies are made to adhere to one another through natural cling or cohesive bonding. The result is a laminated product comprising two layers or plies of LLDPE. The resulting laminate is then passed through a perforator which comprises a series of hot pins that melt the film around them to liquid state. The pins do not need to pierce the laminate in forming perforations. As the melted sections of the polymeric product resolidify, reinforcements or welds are formed around each perforation. The resulting laminated product or stretch wrap film is subsequently rewound about another core.

An interesting feature of the present invention is that when the film is stretched, circular shaped perforations defined by the hot pins maintain their overall shape. In other words, as the film is stretched, the individual circular perforations develop larger circular configurations. It is not likely that the perforations become elongated in the direction of the stretch. The 1½ mm perforations may elastically stretch to three times their initial size.

The linear low density polyethylene resin film used in the preferred embodiment is a co-extrusion of a number of components. For example, each film 10 and 14 may be co-extruded with ethyl vinyl acetate (EVA), polyisobutene (PIB) and other additives. The resulting separate film layers or plies are comprised of three sublayers. Two outer or skin sublayers each make up about 10% of the film. The center or core layer makes up about 80% of the film. The PIBs and EVAs are typically within the core sublayer. The three sublayers are extruded by a cast or blown method to form a film that has the ability to stretch up to 300% over the original length. The resulting co-extruded multi-component films are laminated into two layers 10 and 14. The lamination provides for increased strength and the avoidance of tearing.

Figure 4:
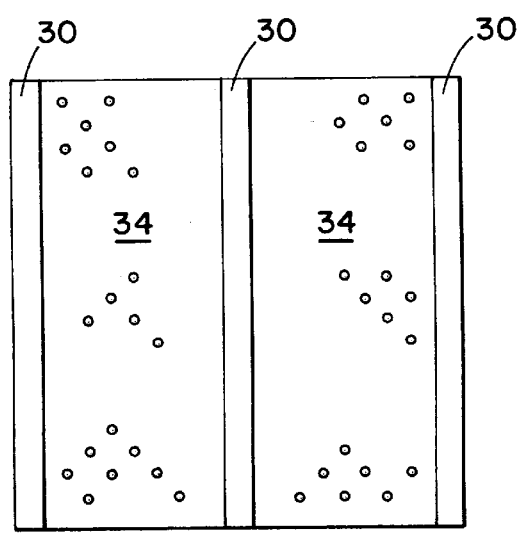
FIGS. 4 and 5 provide examples of stretch wrap film having non-perforated sections.
Figure 5:
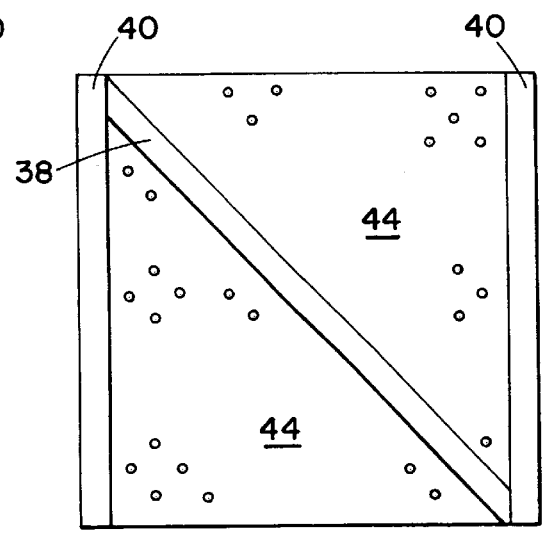

Tearing is further reduced by refraining from perforating certain strips or sections of film. FIGS. 4 and 5 show examples of ways in which the non-perforated strips can be employed. In FIG. 4, roughly three 1" strips 30 appear in a 20 square inch sheet of laminate. The three 1" strips are not perforated while the remaining areas are perforated. These strips serve to add extra strength or reinforcement to the resulting stretch wrap product.

FIG. 5 shows a 20 square inch sheet of laminated stretch wrap with a non-perforated strip 38 transversing across a bias thereof. Other optional portions of non-perforated area 40 are shown. Here again, the non-perforated strips are shown for purposes of adding strength. Areas 44 are perforated.

The resulting perforated stretch film is intended for use in connection with wrapping packages that require breathing. The stretch wrap typically calls for load bundling or palletizing. The loads or packages will be wrapped using stretch wrap machinery such as that provided by Lantech, Stretch Tec and others. The stretch wrap is strong and tough and offers excellent load retention. While applying the stretch wrap to loads or packaging, it should be overlapped around 1.5" from layer to layer. Only one wrap from top to bottom is required, but the product will still offer ventilation with two layers. The film will stretch to as much as 200 to 300% beyond its original length, although roughly a 120% stretch is all that is needed with this product.

Figure 6:
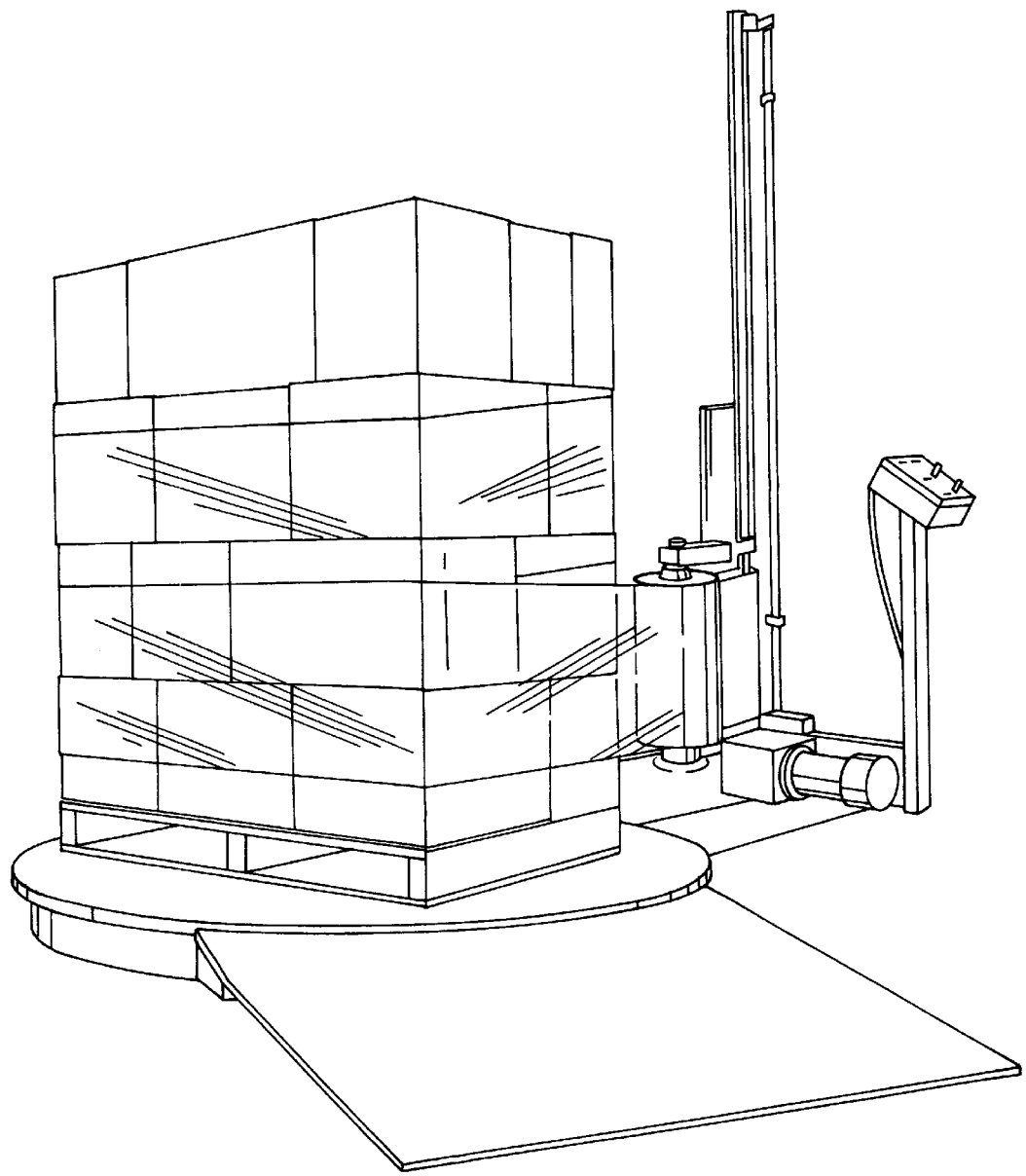
FIG. 6 shows a method of applying stretch wrap film to a bundle.

FIG. 6 shows an example of wrapping a bundle of boxes using the stretch wrap of the present invention. The film is initially placed against the load and then slightly stretched or pulled in a longitudinal direction as it wraps. The elastic nature of the stretch wrap causes it to recede slightly from its stretched state to form a tight fit around the load. The stretch wrap is applied so that it overlaps itself by around 1.5" during consecutive passes. This self cling ability allows for completing the bundling or packaging operation without application of fasteners or adhesives. The wrapping operation may take place in any number of conventional ways. For example, as shown in the figure, the load may be spun on a rotating platform with the stretch wrap positioned on a roll in vertical relation to the platform, thus providing a horizontal wrap. The roll is moved in upward and downward directions to complete the wrap. It is also possible for the platform to raise and lower. Although not shown, the wrapping may occur in other manners such as, for example, wrapping a load in vertical or multi-layer fashions.

The advantage of breathability can also be accomplished by preparing a narrow strip, (i.e. 5" in some instances) of unperforated laminated sheet wrap product and applying it to a pallet or bundle without self-overlap. In other words, by wrapping a relatively narrow ribbon of sheet wrap product around a load such that gaps are left between passes, the wrap forms a strong yet fluid-permeable palletizing or bundling material.

Figure 7:
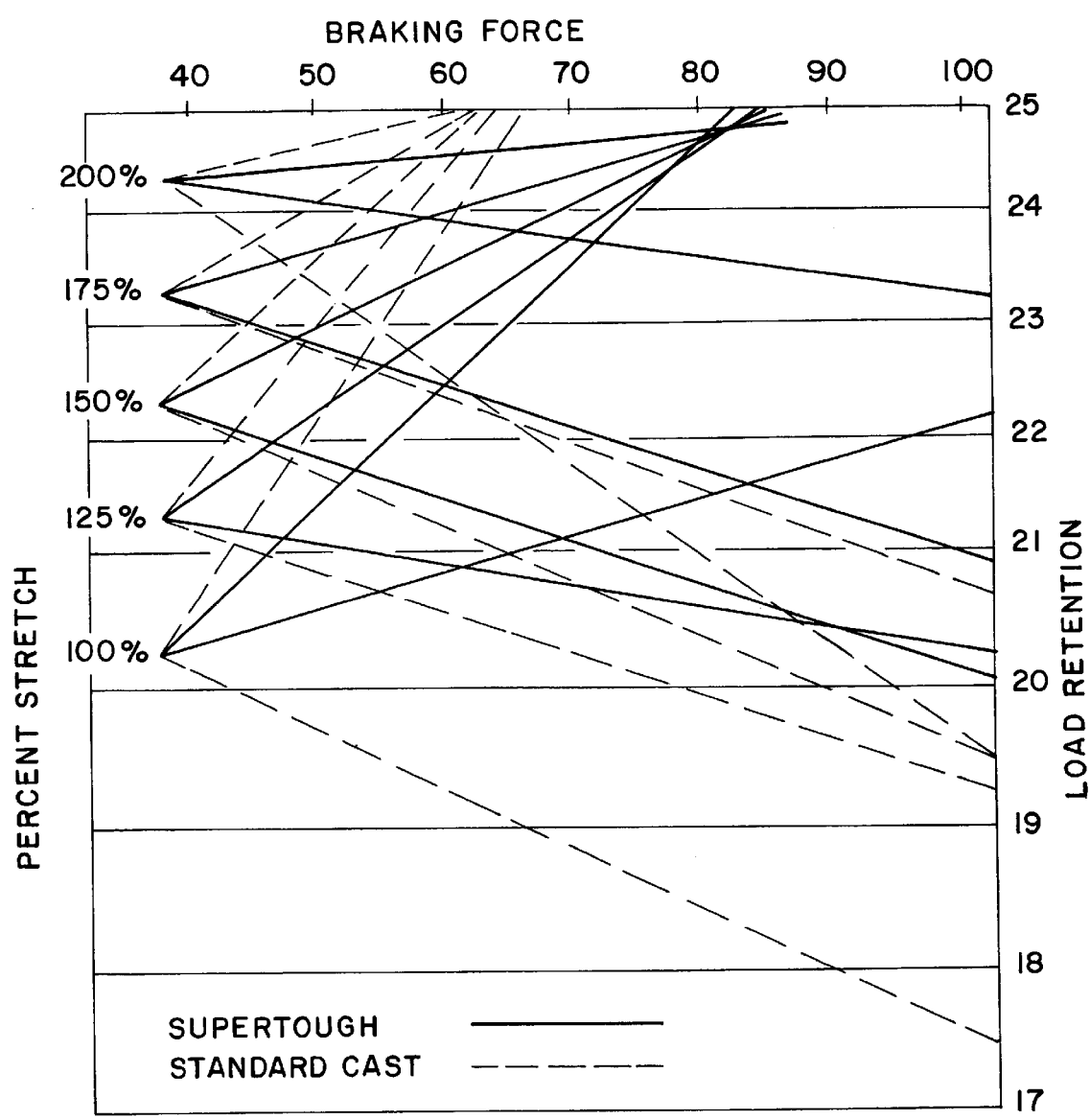
FIG. 7 graphically represents the results of comparative breaking and load retention tests.

Comparative breaking and load retention tests were conducted using 20" rolls of the laminated sheet wrap product of the present invention and 20" rolls of a standard cast 90 film. Results are shown in FIG. 7. As will be noted, for each given percent of stretch, the laminated product of the present invention showed improved results in both breaking and load retention.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

I claim:

1. A fluid permeable stretch film, comprising:
   a first extruded sheet of polyethylene stretch film having a plurality of coextruded layers and capable of stretching beyond its original length;
   a second extruded sheet of polyethylene stretch film having a plurality of coextruded layers and capable of stretching beyond its original length, said second coextruded sheet completely bonded to said first extruded sheet by cling forces to form a completely laminated product; and
   a plurality of reinforcing perforations defined through said laminated product for transfer of fluids therethrough, the resulting laminated product elastically stretchable beyond 80% without breaking and not heat shrinkable.

2. A fluid permeable stretch film, as set forth in claim 1, wherein said first and second polyethylene stretch films comprise linear low density polyethylene.

3. A fluid permeable stretch film, as set forth in claim 1, wherein said polyethylene stretch films of the first and second layers are each stretchable to 150% beyond their original length.

4. A fluid permeable stretch film, as set forth in claim 1, wherein the perforations are approximately one and one half mm in size in an unstretched laminated product.

5. A fluid permeable stretch film, as set forth in claim 1, wherein the laminated product comprises approximately 27 perforations per square inch.

6. A fluid permeable stretch film, as set forth in claim 1, wherein the perforations defined by the fluid permeable stretch film are further defined by welds for reinforcing the natural cling forces between the first and second layers and providing strength to the stretch film.

7. A fluid permeable stretch film, as set forth in claim 1, wherein segments of the laminated products are generally not perforated.

8. A fluid permeable stretch film, comprising:
   a first layer of extruded polyethylene stretch film comprised of a plurality of coextruded layers;
   a second layer of extruded polyethylene stretch film comprised of a plurality of coextruded layers and having a surface an entirety of which is completely laminated to a surface of the first layer to form a laminated film, the laminated film defining a plurality of welds which in turn define a plurality of perforations through the laminated film for allowing permeation of fluids therethrough, the perforated laminated film capable of being stretched to a least 80% beyond its original length.

* * * * *